(12) United States Patent
Hosoya

(10) Patent No.: US 9,235,071 B2
(45) Date of Patent: Jan. 12, 2016

(54) DISPLAY DEVICE

(71) Applicant: Semiconductor Energy Laboratory Co., Ltd., Atsugi, Kanagawa-ken (JP)

(72) Inventor: Kunio Hosoya, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 14/323,316

(22) Filed: Jul. 3, 2014

(65) Prior Publication Data

US 2014/0333882 A1    Nov. 13, 2014

Related U.S. Application Data

(60) Continuation of application No. 13/785,493, filed on Mar. 5, 2013, now Pat. No. 8,773,632, which is a division of application No. 11/648,582, filed on Jan. 3, 2007, now Pat. No. 8,395,746.

(30) Foreign Application Priority Data

Jan. 31, 2006   (JP) ................................. 2006-021722

(51) Int. Cl.
*G02F 1/1333* (2006.01)
*G02F 1/1345* (2006.01)
*G02F 1/1343* (2006.01)

(52) U.S. Cl.
CPC ........ *G02F 1/133305* (2013.01); *G02F 1/1345* (2013.01); *G02F 1/13452* (2013.01);
(Continued)

(58) Field of Classification Search
CPC ....................... G02F 1/13452; G02F 1/134363

USPC .................................. 349/141, 143, 149–152
See application file for complete search history.

(56) References Cited

U.S. PATENT DOCUMENTS 5,670,994 A    9/1997   Kawaguchi et al.
5,691,793 A    11/1997  Watanabe et al.
(Continued)

FOREIGN PATENT DOCUMENTS

CN   001276628 A   12/2000
EP      1045451 A   10/2000
(Continued)

OTHER PUBLICATIONS

Office Action (Application No. 200710007396.2) Dated Jul. 17, 2009.

(Continued)

*Primary Examiner* — Dung Nguyen
(74) *Attorney, Agent, or Firm* — Eric J. Robinson; Robinson Intellectual Property Law Office, P.C.

(57) ABSTRACT

It is an object of the present invention to provide a display device where expansion of a frame portion over a substrate, which results from formation of a lead wiring over an active matrix substrate, is minimally suppressed to realize a narrow frame. According to one feature of a display device of the present invention, a chamfer portion is formed at least at an end portion of an active matrix substrate having a pixel portion of a pair of substrates disposed to be opposed to each other, and wirings (a source line, a gate line, a storage capacitor line, a leading out wiring, and the like) over the active matrix substrate are electrically connected by a common wiring formed in the chamfer portion.

31 Claims, 11 Drawing Sheets

(52) U.S. Cl.
CPC .... *G02F1/133308* (2013.01); *G02F 1/134309* (2013.01); *G02F 1/134363* (2013.01); *G02F 2001/13456* (2013.01)

(56) References Cited

U.S. PATENT DOCUMENTS

| | | | |
|---|---|---|---|
| 6,025,901 | A | 2/2000 | Adachi et al. |
| 6,219,127 | B1 | 4/2001 | Hirakata et al. |
| 6,624,868 | B1 | 9/2003 | Terukina et al. |
| 6,825,820 | B2 | 11/2004 | Yamazaki et al. |
| 6,977,708 | B2 | 12/2005 | Tanaka et al. |
| 7,094,684 | B2 | 8/2006 | Yamazaki et al. |
| 7,102,231 | B2 | 9/2006 | Yamazaki et al. |
| 7,456,430 | B1 | 11/2008 | Yamazaki et al. |
| 7,492,434 | B2 | 2/2009 | Kudo et al. |
| 7,855,380 | B2 | 12/2010 | Yamazaki et al. |
| 8,071,981 | B2 | 12/2011 | Yamazaki et al. |
| 8,129,721 | B2 | 3/2012 | Yamazaki et al. |
| 8,395,746 | B2 * | 3/2013 | Hosoya .................... 349/158 |
| 2005/0011752 | A1 | 1/2005 | Yamazaki et al. |
| 2005/0093802 | A1 | 5/2005 | Yamazaki et al. |
| 2005/0127818 | A1 | 6/2005 | Ohtani |
| 2006/0252260 | A1 | 11/2006 | Yamazaki et al. |

FOREIGN PATENT DOCUMENTS

| | | |
|---|---|---|
| EP | 1780589 A | 5/2007 |
| EP | 1786037 A | 5/2007 |
| EP | 2256817 A | 12/2010 |
| JP | 09-022022 A | 1/1997 |
| JP | 2000-187237 A | 7/2000 |
| JP | 2001-305568 A | 10/2001 |
| JP | 2004-061688 A | 2/2004 |
| WO | WO-2004/027740 | 4/2004 |
| WO | WO-2004/070820 | 8/2004 |
| WO | WO-2005/055309 | 6/2005 |
| WO | WO-2005/059990 | 6/2005 |

OTHER PUBLICATIONS

Chinese Office Action (Application No. 200710007396.2) Dated Apr. 16, 2012.

* cited by examiner

FIG. 5A
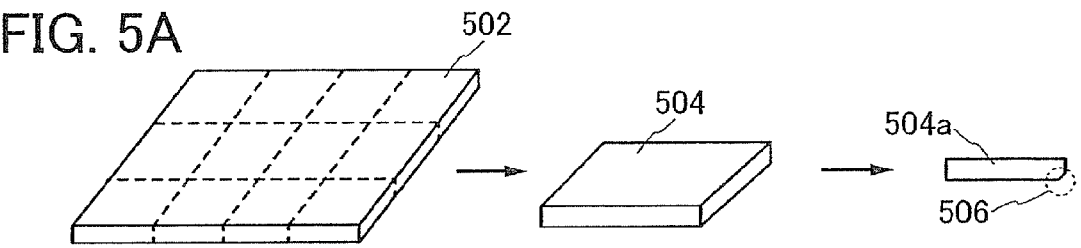
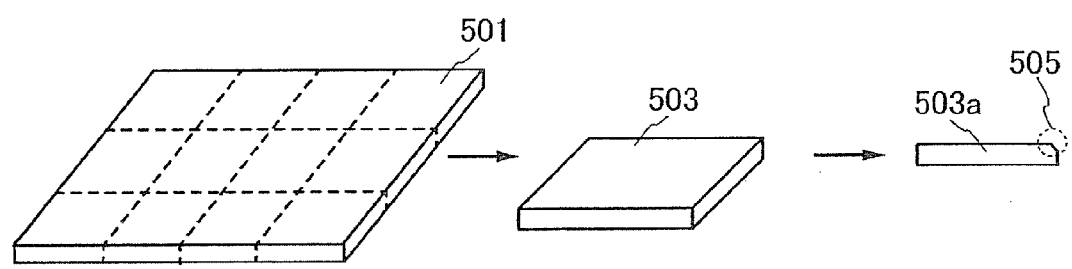
FIG. 5B
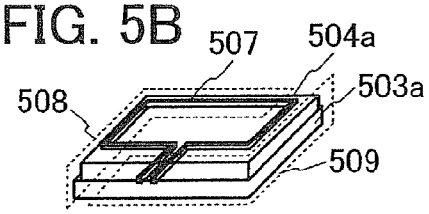
FIG. 5C
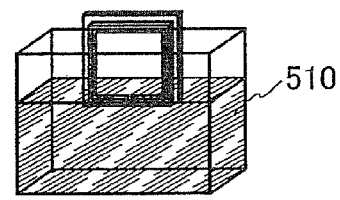
FIG. 5D
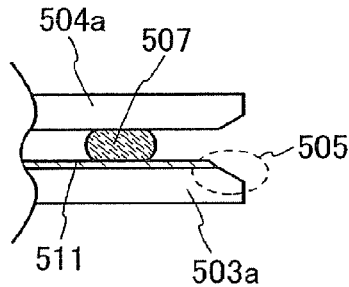
FIG. 5E
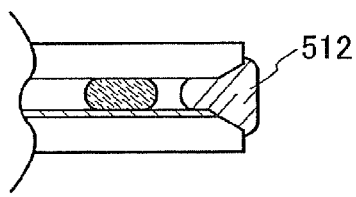

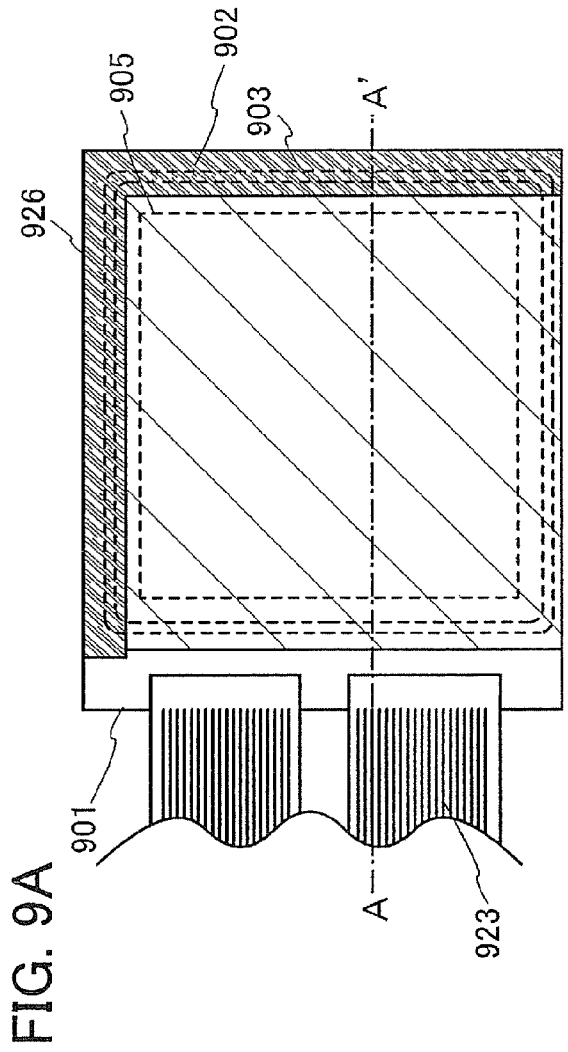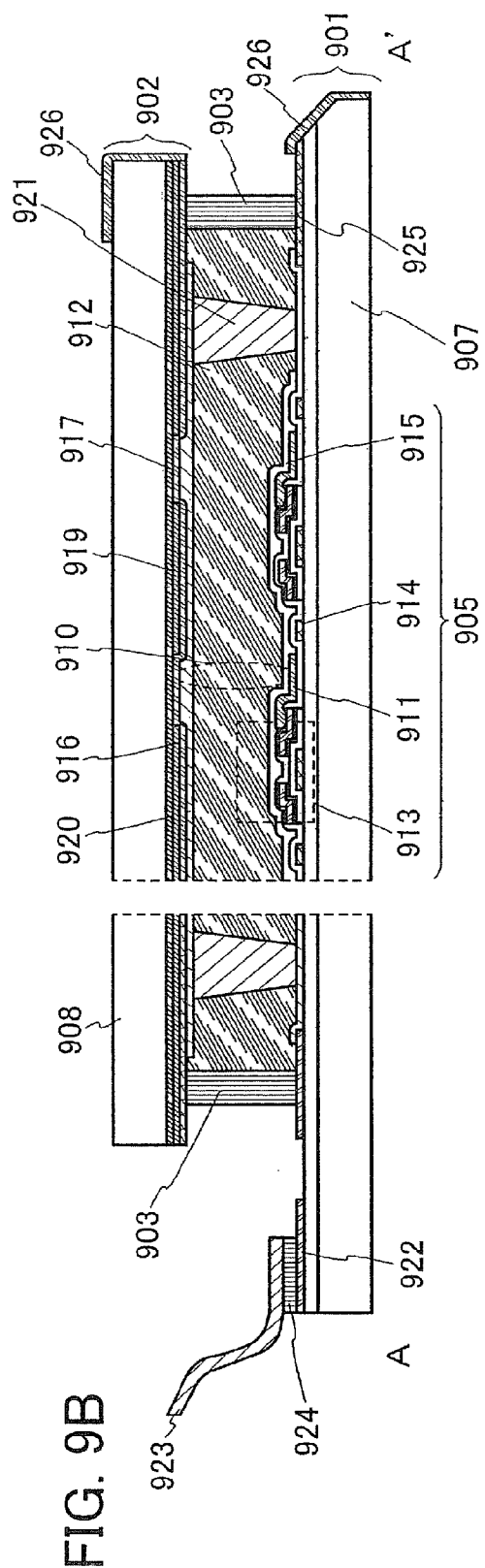

DISPLAY DEVICE

BACKGROUND OF THE INVENTION

1. Field of the Invention

The present invention relates to an active matrix display device having an active matrix display portion which is structure by formation of a thin film transistor (hereinafter, referred to as a TFT) over a substrate.

2. Description of the Related Art

Conventionally, display devices typified by a liquid crystal display device and a light-emitting device have been known as active matrix display devices using active elements such as TFTs. In these active matrix display devices, pixel density can be increased. In addition, the active matrix display devices are small and lightweight, and consume low power. Accordingly, products using active matrix display devices such as a monitor for a computer, a television, and a monitor for a car navigation system have been developed as one of flat panel displays in substitution for a CRT display.

In addition, each of these active matrix display devices has a structure including an active matrix substrate. For example, in a case of a liquid crystal display device, display is performed in the following manner: a substrate (an active matrix substrate) provided with a pixel portion including a first electrode (a pixel electrode) and the like in addition to a plurality of TFTs and wirings and a substrate (an opposite substrate) provided with a second electrode (an opposite electrode), a light-shielding film (a black matrix), a colored film (a color filter), and the like are attached to each other; a space between these substrates is filled and sealed with a liquid crystal material; and liquid crystal molecules are oriented by an electric field which is applied between the pixel electrode and the opposite electrode to control the amount of light from a light source.

Note that, in the active matrix substrate, the wirings (a source line, a gate line, a storage capacitor line, and the like) formed in the pixel portion are electrically connected to lead wirings (also referred to as a common line, a ground line, or a ground line) which are formed in the periphery of the pixel portion in order to secure a function and an optimum layout of the active matrix substrate. Conventionally, these lead wirings have an advantage that the manufacturing process can be simplified because the lead wirings can be manufactured in the same process with the use of the same conductive material as the component formed in the pixel portion.

However, these lead wirings are long in length and wiring resistance thereof is increased even with the use of a low-resistant metal. Therefore, as compared with the wirings of the pixel portion, it is necessary to increase the width of the lead wirings. However, in order to increase the width of the lead wirings, there has been a problem that the area of a frame portion (a peripheral region over the substrate other than the pixel portion) is increased.

In downsizing the display device, it is important to narrow a frame thereof in order to form a panel having a large display region, and various attempts have been made (for example, see Patent Document 1: Japanese Published Patent Application No. 2000-187237).

SUMMARY OF THE INVENTION

It is an object of the present invention to provide a display device where expansion of a frame portion over a substrate, which results from formation of a lead wiring over an active matrix substrate, is minimized to realize a narrow frame.

According to one feature of a display device of the present invention, a chamfer portion is formed at least at an end portion of an active matrix substrate having a pixel portion of a pair of substrates disposed to be opposed to each other, and wirings (a source line, a gate line, a storage capacitor line, a leading out wiring, and the like) over the active matrix substrate are electrically connected by a common wiring formed in the chamfer portion.

According to a specific structure relating to the display device of the present invention, a display device includes at least a pair of substrates disposed to be opposed to each other; a wiring formed up to the end portion of an opposite surface of one of the pair of substrates; a chamfer portion formed at the end portion of the substrate where the wiring is formed; and a common wiring formed in the chamfer portion and vicinity thereof. In the display device, the wiring is electrically connected to the common wiring in the chamfer portion or vicinity thereof.

According to another structure relating to the display device of the present invention, a display device includes at least a pair of substrates each having a different area disposed to be opposed to each other; a chamfer portion, which is at the end portion of the opposite surface of the substrate having a larger area of the pair of substrates, formed in a position where the substrate having a smaller area is not overlapped; a wiring formed up to vicinity of the chamfer portion; and a common wiring formed in the chamfer portion and vicinity thereof. In the display device, the wiring is electrically connected to the common wiring in the chamfer portion or vicinity thereof.

According to another structure relating to the display device of the present invention, a display device includes at least a pair of substrates disposed to be opposed to each other; a plurality of thin film transistors formed over an opposite surface of one of the pair of substrates; a wiring electrically connected to at least one of the plurality of thin film transistors; a chamfer portion formed at the end portion of the substrate where the plurality of thin film transistors and the wiring are formed; and a common wiring fondled in the chamfer portion and vicinity thereof. In the display device, the wiring is electrically connected to the common wiring in the chamfer portion or vicinity thereof.

According to another structure relating to the display device of the present invention, a display device includes at least a pair of substrates disposed to be opposed to each other; a plurality of thin film transistors formed over an opposite surface of one of the pair of substrates; a source line electrically connected to at least one of the plurality of thin film transistors; a leading out wiring electrically connected to an external circuit; a chamfer portion formed at the end portion of the substrate where the plurality of thin film transistors, the source line, and the leading out wiring are formed; and a common wiring formed in the chamfer portion and vicinity thereof. In the display device, the source line and the leading out wiring are electrically connected to the common wiring in the chamfer portion or vicinity thereof.

Note that, in each of the above structures, the common wiring is formed to include a conductive material containing at least one of Ag, Au, Cu, Ni, Pt, Pd, Ir, Rh, W, Al, Ta, Mo, Cd, Zn, Fe, Ti, Si, Ge, Zr, Ba, and Nd, or indium tin oxide (ITO) or indium zinc oxide (IZO), which is a transparent conductive film.

In the present invention, a display device refers to a device using a liquid crystal element or a light-emitting element, namely, an image display device. In addition, the following are all included in a display device: a module in which a connector, for example, an FPC (Flexible Printed Circuit), a TAB (Tape Automated Bonding) tape, or a TCP (Tape Carrier Package) is attached to a display panel (a liquid crystal display panel or a light-emitting panel); a module provided with a printed wiring board at the end of a TAB tape or a TCP; and a module in which an IC (integrated circuit) or a CPU (central processing unit) is directly mounted on a display panel by a COG (chip on glass) method.

A narrow frame of a display panel can be realized because a common wiring can be formed in the end portion of the substrate in substitution for a lead wiring over an active matrix substrate so that expansion of a frame portion over the substrate can minimally be suppressed by implementation of the present invention. In addition, the common wiring of the present invention can be formed thick in film thickness in its manufacturing; therefore, it is possible to reduce wiring resistance thereof.

BRIEF DESCRIPTION OF DRAWINGS

In the accompanying drawings:

FIGS. 5A to 5E are views each explaining a manufacturing method of a display panel of the present invention;

FIGS. 9A and 9B are views each explaining a display panel of the present invention;

DETAILED DESCRIPTION OF THE INVENTION

Embodiment modes of the present invention will be explained hereinafter with reference to the accompanying drawings. However, it is to be easily understood that various changes and modifications will be apparent to those skilled in the art. Therefore, unless such changes and modifications depart from the purpose and the scope of the present invention, they should be construed as being included therein.

Embodiment Mode 1

This embodiment mode will explain a liquid crystal panel used for a liquid crystal display device as an example of a display panel used for a display device. Specifically, a liquid crystal material is sandwiched between an active matrix substrate and an opposite substrate by a One Drop Filling (ODF) method. After attaching the both substrates, an element forming surface side of the end portion of the active matrix substrate is chamfered, a common wiring is formed in a chamfer portion or the like, and wirings (a source line, a gate line, a storage capacitor line, a leading out wiring, and the like) formed over the active matrix substrate are electrically connected by the common wiring. A case having such a structure will be explained. Note that the leading out wiring is an extracted portion of the source line, a gate line, the storage capacitor line, or the like, which is formed outside the pixel portion, and which connects the pixel portion and an external circuit.

Figure 1:
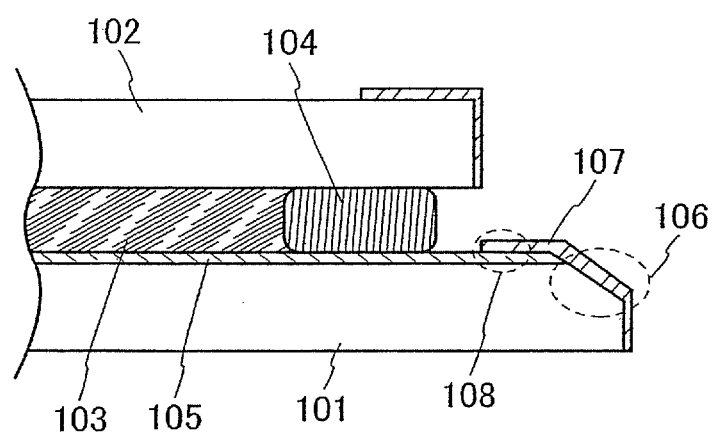
FIG. 1 is a view explaining a structure of the present invention.

FIG. 1 shows a cross section of the end portion of a liquid crystal panel where a liquid crystal material 103 is sandwiched between an active matrix substrate 101 and an opposite substrate 102 and the both substrates are attached to each other with a sealant 104. Note that, although not shown here, over a surface (an opposite surface) of the active matrix substrate 101 where the opposite substrate 102 is disposed, a wiring (a leading out wiring) or the like used so as to be connected to an external driver circuit or the like is formed, in addition to a plurality of pixel electrodes, a plurality of elements such as thin film transistors (TFTs) that form a pixel portion, and a plurality of wirings (a source line, a gate line, a storage capacitor line, and the like). The plurality of elements such as TFTs is electrically connected to the pixel electrode or the wirings (a source line, a gate line, a storage capacitor line, and the like).

Thus, a wiring 105 shown in FIG. 1 shows the wirings (a source line, a gate line, a storage capacitor line, and the like) that is electrically connected to the elements such as TFTs that form the pixel portion, or the wiring (a leading out wiring) used so as to be connected to an external driver circuit or the like. The wiring 105 is formed up to the end portion of the active matrix substrate 101.

In the case of Embodiment Mode 1, the area of the opposite substrate 102 is smaller than that of the active matrix substrate 101 and there is a portion where the opposite substrate 102 is not overlapped over the active matrix substrate 101 in attaching the active matrix substrate and the opposite substrate. Therefore, as shown in FIG. 1, the end portion of the active matrix substrate 101 can be chamfered. Note that, in order to easily form an auxiliary electrode, which will be formed later, the end portion of the surface of the opposite substrate 102, which is opposite to the surface where the active matrix substrate 101 is disposed, may be chamfered as well.

In addition, a common wiring 107 formed of a conductive material is formed in the chamfered portion (hereinafter, referred to as a chamfer portion 106). Note that the common wiring 107 is formed so as to be electrically connected to the wiring 105 over the active matrix substrate 101 in a connection portion 108.

The common wiring 107 is formed in the chamfer portion 106 as described above; therefore, the wiring pattern formed over the active matrix substrate can have a minimum shape. Accordingly, the area of a peripheral portion other than the pixel portion over the substrate can be made smaller than the conventional one (that is, a frame can be narrowed).

Here, a specific manufacturing method of the liquid crystal panel shown in FIG. 1 will be explained with reference to FIGS. 2A to 2F and FIGS. 3A and 3B. Note that the common reference numerals are used in FIGS. 2A to 2F and FIGS. 3A and 3B.

Figure 2A:
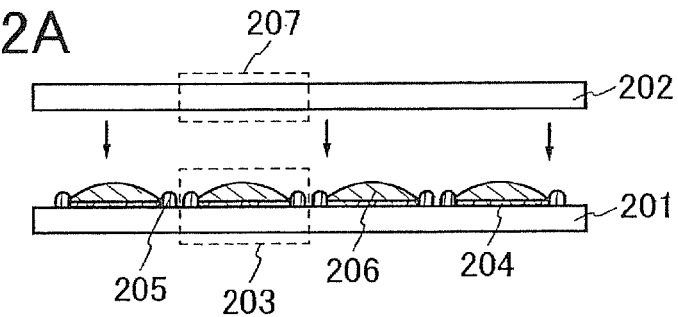
FIGS. 2A to 2F are views each explaining a manufacturing method of a display panel of the present invention.

First, as shown in FIG. 2A, a plurality of active matrix substrates 203 are formed over a first substrate 201, and the periphery of a pixel portion 204 of each active matrix substrate is coated with a sealant 205. Then, after dropping a liquid crystal material 206 onto the region surrounded with the sealant 205, a second substrate 202, where a plurality of opposite substrates 207 are formed, is attached to the first substrate 201 (FIG. 2B).

Note that a known liquid crystal material can be used as the liquid crystal material 206 which is used here.

Figure 2B:
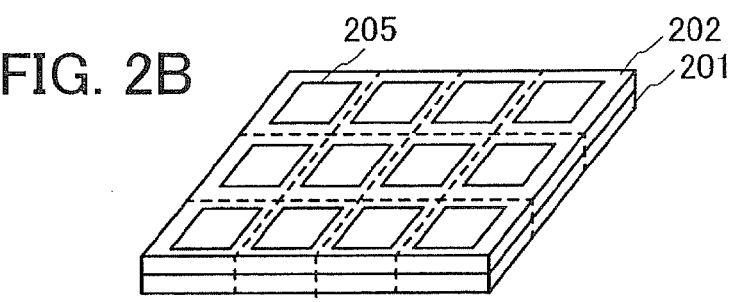
Figure 2C:
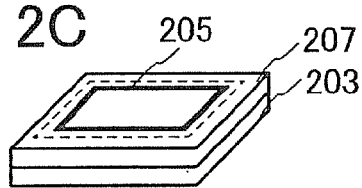

Next, a liquid crystal panel shown in FIG. 2C is obtained after separation of the attached substrates in accordance with dotted lines of FIG. 2B. Note that the liquid crystal panel shown in FIG. 2C has a structure where the active matrix substrate 203 and the opposite substrate 207 are attached with the sealant 205.

Figure 2D:
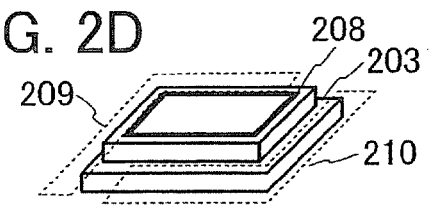

Then, only the opposite substrate 207 is separated from the separated liquid crystal panel in accordance with a dotted line of FIG. 2C to obtain a structure shown in FIG. 2D. The area of an opposite substrate 208 that is obtained in such a manner gets smaller than that of the active matrix substrate 203. In the liquid crystal panel shown in FIG. 2D, a connection portion to a driver circuit is formed on two sides denoted by reference numeral 209, and a chamfer portion is formed on the other two sides denoted by reference numeral 210 in order to form a common wiring. Note that a chamfer portion may also be formed on the sides where the connection portion to a driver circuit is formed.

Figure 3A:
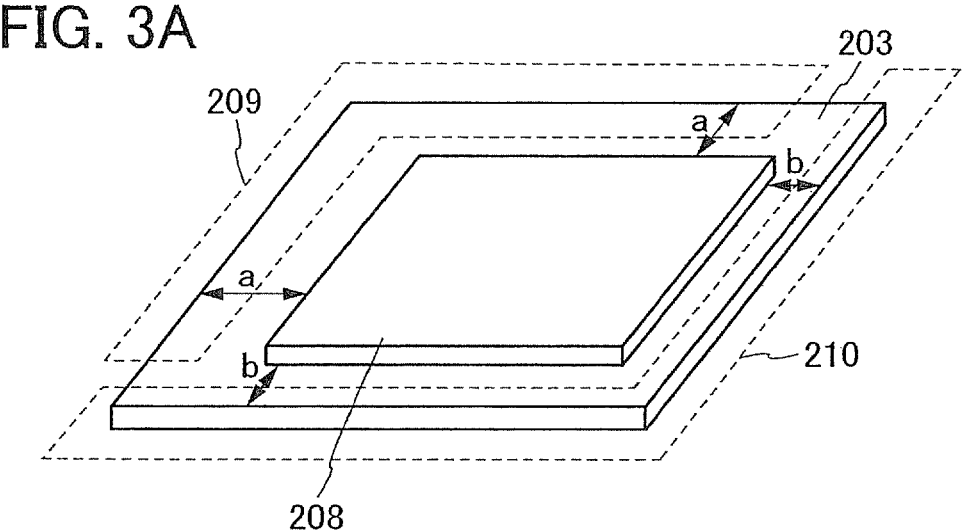
FIGS. 3A and 3B are views each explaining the structure of a display panel of the present invention.

Specifically, the sizes of the active matrix substrate and the opposite substrate are preferably made to be those shown in FIG. 3A. In other words, in FIG. 3A, a region a (209) including two sides where the connection portion to the driver circuit is formed is to be provided with a distance (a) from the opposite substrate 208 to the end portion of the active matrix substrate 203, and a region b (210) including the other two sides where the connection portion to the driver circuit is not formed is to be provided with a distance (b) from the opposite substrate 208 to the end portion of the active matrix substrate 203. Note that, in this case, the relation between the distances (a) and (b) satisfies the distance (a)>the distance (b).

Figure 2E:
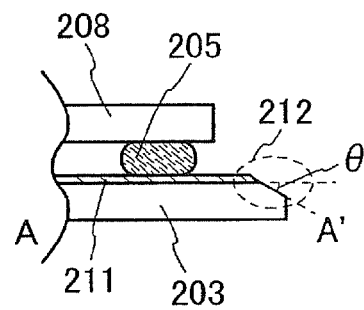
Figure 3B:
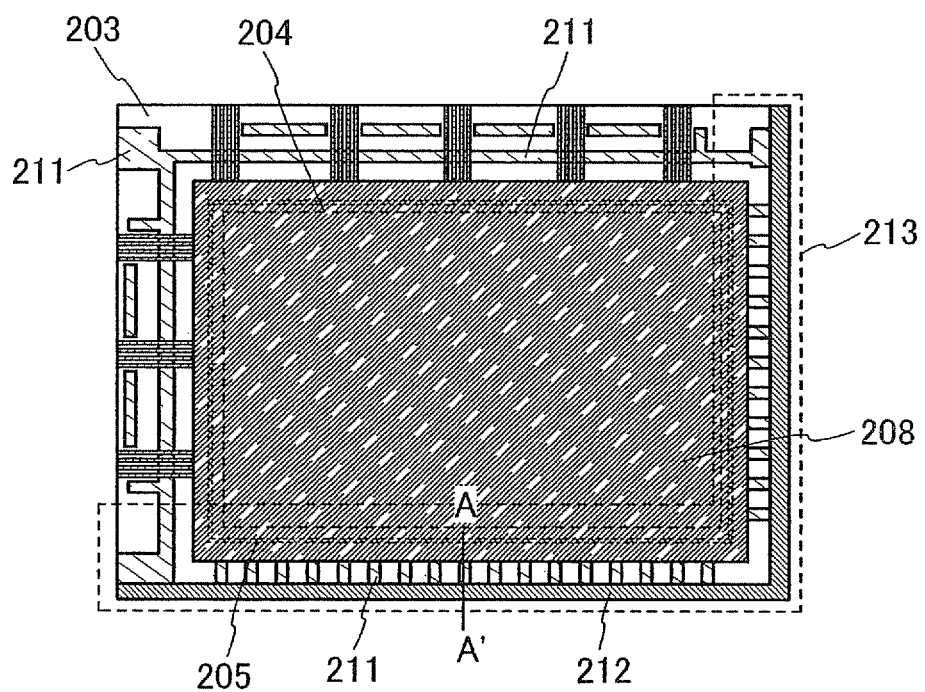

In addition, FIG. 3B shows a state where a chamfer portion 212 is formed in the region b (210) of the liquid crystal panel shown in FIG. 3A, and FIG. 2E shows a cross-sectional view taken along a line A-A' of FIG. 3B. Note that, in order to form the chamfer portion 212, a known method, for example, grinding with the use of a grindstone such as diamond or chamfer using a laser can be used. Moreover, as shown in FIG. 2E, in the present invention, the shape of the chamfer portion 212 has an angle (θ), where a flat surface of a substrate and a flat surface where the chamfer portion 212 is formed are intersected, to be a chamfer angle, and the chamfer angle (θ) may satisfy 0°<θ<90° or may have a shape having a curved surface (an R surface).

Moreover, in forming the chamfer portion 212, first, part of wirings 211 which are formed up to the end portion of the active matrix substrate 203 is chamfered along with the end portion of the active matrix substrate 203. However, in order to electrically connect a common wiring formed in the subsequent step to the wiring 211, it is necessary to leave part of the wirings 211 between the chamfer portion 212 and the end portion of the opposite substrate 208.

Then, by forming common wiring 214 in a portion shown by a region c (213) of FIG. 3B, all of the wirings 211 formed over the active matrix substrate 203 can be connected electrically.

Note that, as the manufacturing method of the common wiring 214, sputtering, evaporation, droplet discharging, PVD, CVD, coating, or the like can be used, and as the conductive material used to form the common wiring 214, for example, a metal element such as Ag, Au, Cu, Ni, Pt, Pd, Ir, Rh, W, Al, Ta, Mo, Cd, Zn, Fe, Ti, Si, Ge, Zr, Ba, or Nd, an alloy material containing the metal element as its main component, a compound material such as metal nitride containing the metal element, or a conductive material using a plurality thereof can be used. With the use of these conductive materials, the wiring resistance can be reduced.

In addition, indium tin oxide (ITO), indium zinc oxide (IZO) formed by using a target in which zinc oxide (ZnO) of 2 to 20 wt % is further mixed with indium oxide containing silicon oxide, or the like, which is used as a transparent conductive film, can also be used. In the case of using these materials, a light-transmitting wiring can be formed, which is effective in increasing an aperture ratio of a pixel portion.

Moreover, in the present invention, a conductive material for forming the common wiring 214 can be formed partially or entirely provided for the opposite substrate 208 depending on a structure of a liquid crystal panel or a property of the conductive material. In particular, in a case of an IPS (In-Plain Switching) mode liquid crystal panel, it is preferable to form the common wiring 214 so as to entirely cover the upper surface of the opposite substrate 208.

Figure 2F:
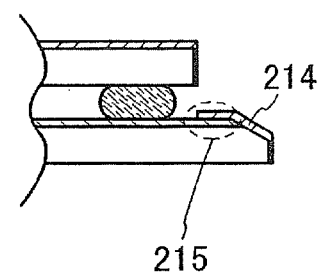

Note that FIG. 2F shows a cross-sectional view taken along a line A-A' of FIG. 3B, in which the common wiring 214 is formed. As shown in FIG. 2F, the wiring 211 is electrically connected to the common wiring 214 in a connection portion 215.

Through the above, the chamfer portion is formed at the end portion of the active matrix substrate, and the common wirings, which electrically connect the wirings formed in the pixel portion or the like, are formed in the chamfer portion. Accordingly, the area of the wirings conventionally led to the peripheries of pixels can be reduced; therefore, a frame of the liquid crystal panel can be narrowed.

Embodiment Mode 2

This embodiment mode will explain a liquid crystal panel used for a liquid crystal display device as an example of a display panel used for a display device. Specifically, after attaching an active matrix substrate, an element forming surface side of the end portion which is chamfered in advance, to an opposite substrate, a liquid crystal material is sandwiched between the both substrates, a common wiring is formed in a chamfer portion or the like, and wirings (a source line, a gate line, a storage capacitor line, a leading out wiring, and the like) formed over the active matrix substrate are electrically connected by the common wiring. A case having such a structure will be explained.

Figure 4:
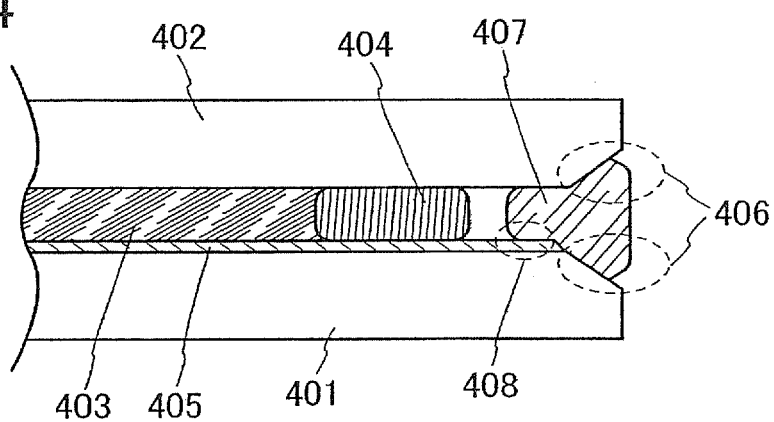
FIG. 4 is a view explaining a structure of the present invention.

FIG. 4 shows a cross section of the end portion of a liquid crystal panel formed by being injected with a liquid crystal material 403 after attaching an active matrix substrate 401, which is chamfered in advance, and an opposite substrate 402 to each other with a sealant 404. Note that, although not shown here, over a surface (an opposite surface) of the active matrix substrate 401 where the opposite substrate 402 is disposed, a wiring (a leading out wiring) or the like used so as to be connected to an external driver circuit or the like is formed, in addition to a plurality of pixel electrodes, a plurality of elements such as thin film transistors (TFTs) that form a pixel portion, and a plurality of wirings (a source line, a gate line, a storage capacitor line, and the like). The plurality of elements such as TFTs is electrically connected to the pixel electrode or the wirings (a source line, a gate line, a storage capacitor line, and the like).

Thus, a wiring 405 shown in FIG. 4 shows the wirings (a source line, a gate line, a storage capacitor line, and the like) that is electrically connected to the elements such as TFTs that form the pixel portion, or the wiring (a leading out wiring) used so as to be connected to an external driver circuit or the like. The wiring 405 is formed up to the end portion of the active matrix substrate 401.

In the case of Embodiment Mode 2, the case is shown, where the chamfer portion is formed at each end portion of the surfaces of the active matrix substrate 401 and the opposite substrate 402 facing to each other. However, it is not always necessary to form chamfer portions at the end portions of the both substrates, and a chamfer portion may be formed at least at the end portion of the active matrix substrate 401.

In addition, a common wiring 407 formed of a conductive material is formed in the chamfered portion (hereinafter, referred to as a chamfer portion 406). Note that the common wiring 407 is formed so as to be electrically connected to the wiring 405 over the active matrix substrate 401 in a connection portion 408.

The common wiring 407 is formed in the chamfer portion 406 as described above; therefore, the wiring pattern formed over the active matrix substrate can have a minimum shape. Accordingly, the area of a peripheral portion other than the pixel portion over the substrate can be made smaller than the conventional one (that is, a frame can be narrowed).

Here, a specific manufacturing method of the liquid crystal panel shown in FIG. 4 will be explained with reference to FIGS. 5A to 5E and FIGS. 6A and 6B. Note that the common reference numerals are used in FIGS. 5A to 5E and FIGS. 6A and 6B.

Figure 6A:
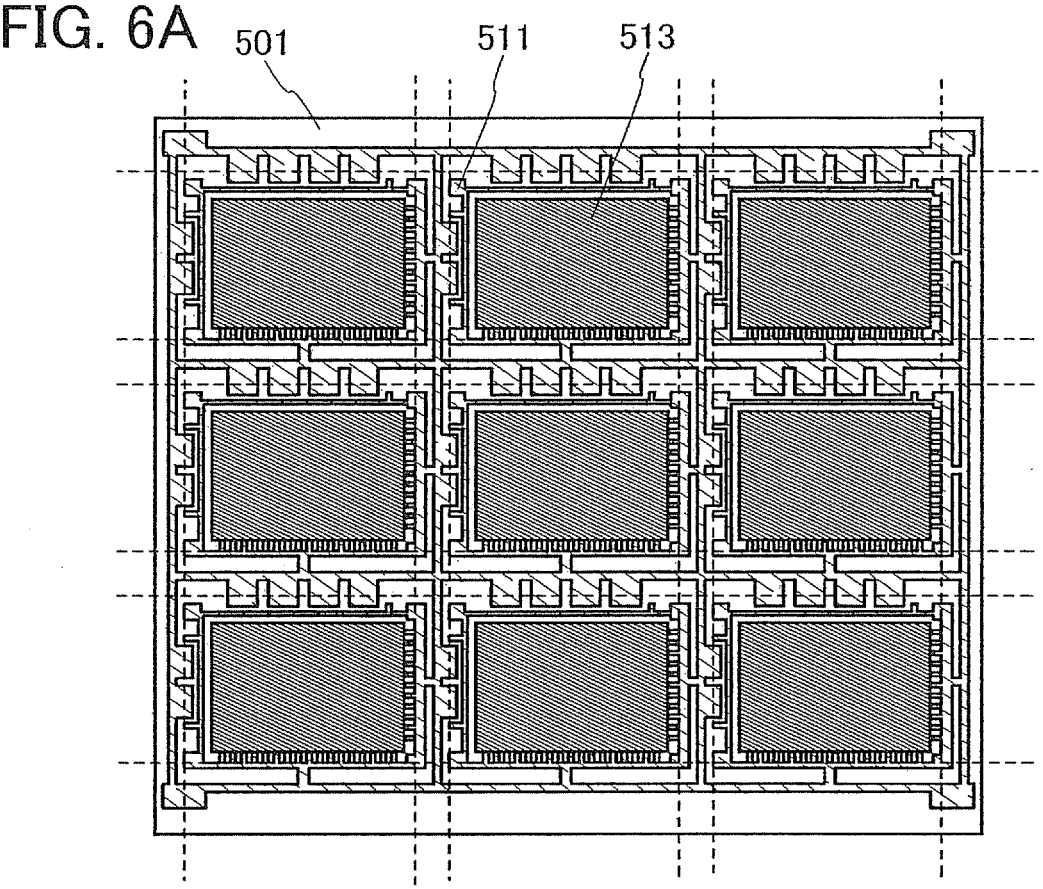
FIGS. 6A and 6B are views each explaining a manufacturing method of a display panel of the present invention.
Figure 6B:
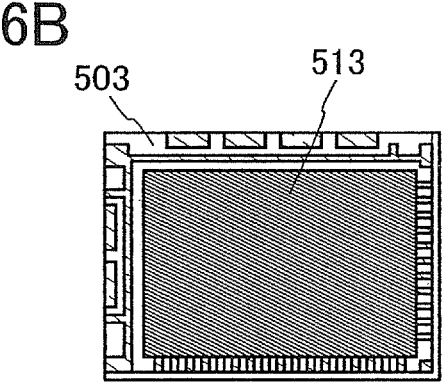

First, as shown in FIG. 5A, a plurality of active matrix substrates are formed over a first substrate 501, and after the separation of these active matrix substrates, a plurality of active matrix substrates 503 are obtained. Note that FIG. 6A shows the first substrate 501 in detail. In addition, the first substrate 501 is separated like a dotted line shown in FIG. 6A to obtain a plurality of active matrix substrates 503 shown in FIG. 6B.

In addition, a plurality of opposite substrates are formed over a second substrate 502, and after the separation of these opposite substrates, a plurality of opposite substrates 504 are obtained. Note that the opposite substrates 504 are separated so as to have a smaller area than that of the active matrix substrate. Then, each end portion of the active matrix substrate 503 and the opposite substrate 504 is chamfered to obtain an active matrix substrate 503a having a chamfer portion 505 and an opposite substrate 504a having a chamfer portion 506. Note that, in order to form the chamfer portions (505 and 506), a known method, for example, grinding with the use of a grindstone such as diamond or chamfer using a laser can be used. Note that, as with the explanation in Embodiment Mode 1, the shape of the chamfer portions (505 and 506) of the case of this embodiment mode also has an angle ($\theta$), where a flat surface of a substrate and a flat surface where the chamfer portions (505 and 506) are formed are intersected, to be a chamfer angle, and the chamfer angle ($\theta$) may satisfy $0°<\theta<90°$ or may have a shape having a curved surface (an R surface).

Moreover, in forming the chamfer portion 505, first, part of wirings 511 which are formed up to the end portion of the active matrix substrate 503 is chamfered along with the end portion of the active matrix substrate 503.

In Embodiment Mode 2, since a connection portion to a driver circuit is formed on two sides of the active matrix substrate 503, the chamfer portions are each formed on the other two sides of the active matrix substrate 503 and two sides of the opposite substrate corresponding thereto.

Next, the active matrix substrate 503a and the opposite substrate 504a are attached to each other with a sealant 507 (FIG. 5B). Note that the sealant 507 surrounds the pixel portion of the active matrix substrate 503a so that an inlet is formed, and the both substrates are disposed so that each of the chamfer portions (505 and 506) faces inside.

Also in the case of Embodiment Mode 2 as in the case of Embodiment Mode 1, in a region c (508) including two sides where the connection portion to the driver circuit is formed, a distance (a)>0 from the opposite substrate 504a to the end portion of the active matrix substrate 503a is provided. Note that a region d (509) including the other two sides where the chamfer portion is formed is not to be provided with a distance from the opposite substrate 504a to the end portion of the active matrix substrate 503a.

Then, as shown in FIG. 5C, a liquid crystal material 510 is injected between the attached both substrates (the active matrix substrate 503a and the opposite substrate 504a), and a liquid crystal panel is obtained by sealing of the inlet. Note that, as the liquid crystal material 510 which is used here, a known liquid crystal material can be used.

In addition, FIG. 5D shows a cross-sectional view of the region d (509) of the liquid crystal panel after the liquid crystal injection. In the chamfer portion 505, part of the wirings 511, which is formed beforehand over the active matrix substrate 503a, is chamfered along with the end portion of the active matrix substrate 503a. With such a structure, a common wiring 512 formed that will be formed in the subsequent step and the wiring 511 can be electrically connected easily.

Then, as shown in FIG. 5E, the wirings 511 formed over the active matrix substrate 503a can be electrically connected by formation of the common wiring 512. Note that, as the manufacturing method of the common wiring 512 in the case of Embodiment Mode 2, a coating method is preferably used in terms of favorable processing workability in consideration of a place where the chamfer portion is formed or the like, and as the material used to form the common wiring 512, a conductive paste material, for example, a conductive paste material such as a metal element such as Ag, Au, Cu, Ni, Pt, Pd, Ir, Rh, W, Al, Ta, Mo, Cd, Zn, Fe, Ti, Si, Ge, Zr, Ba, or Nd, or an alloy material containing the metal element as its main component is preferably used.

After attaching the active matrix substrate, an element forming surface side of the end portion which is chamfered in advance, to the opposite substrate, a liquid crystal material is sandwiched between the both substrates with the use of a liquid crystal injection method, and the common wiring is formed in the chamfer portion or the like. Embodiment Mode 2 explains such a case; however, a method (ODF) for attaching the active matrix substrate, an element forming surface side of the end portion which is chamfered in advance, to the opposite substrate can be used after sandwich of the liquid crystal material between the both substrates.

Through the above, the chamfer portion is formed at the end portion of the active matrix substrate, and the common wirings, which electrically connect the wirings formed in the pixel portion or the like, are formed in the chamfer portion. Accordingly, the area of the wirings conventionally led to the peripheries of pixels can be reduced; therefore, a frame of the liquid crystal panel can be narrowed.

Embodiment Mode 3

As the manufacturing method of the active matrix substrate that can be used for Embodiment Mode 1 or 2, this embodiment mode will particularly explain a manufacturing method of an amorphous silicon thin film transistor (TFT) and a pixel electrode formed in a pixel portion (reference numeral 204 of FIG. 3B and reference numeral 513 of FIGS. 6A and 6B) over an active matrix substrate, with reference to FIGS. 7A to 7E and FIGS. 8A to 8D. Note that explanation will be given in FIGS. 7A to 7E and FIGS. 8A to 8D with the common reference numerals.

Figure 7A:
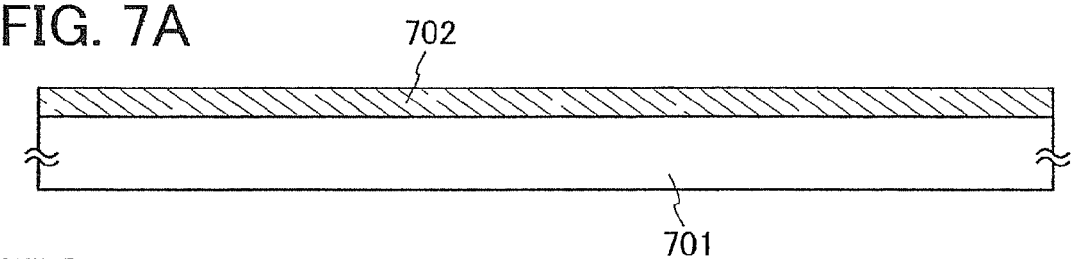
FIGS. 7A to 7E are views each explaining a manufacturing method of an active matrix substrate of the present invention.

As shown in FIG. 7A, a first conductive film 702 is formed over a substrate 701. The first conductive film 702 can be formed using a film formation method such as sputtering, PVD, CVD, droplet discharging, printing, or electroplating. As the material that is used to form the first conductive film 702, for example, a metal element such as Ag, Au, Cu, Ni, Pt, Pd, Ir, Rh, W, Al, Ta, Mo, Cd, Zn, Fe, Ti, Si, Ge, Zr, Ba, or Nd, an alloy material containing the metal element as its main component, a compound material such as metal nitride containing the metal element, or a material using a plurality thereof can be used. Since these materials are a low-resistant conductive material, the wiring resistance can be reduced.

In addition, as the material used to form the first conductive film 702, indium tin oxide (ITO), indium zinc oxide (IZO) formed by using a target in which zinc oxide (ZnO) of 2 to 20 wt % is further mixed with indium oxide containing silicon oxide, or the like, which is used as a transparent conductive film, can also be used. In the case of using these materials, a light-transmitting wiring can be formed, which is effective in increasing an aperture ratio of a pixel portion.

A glass substrate, a quartz substrate, a substrate formed from an insulating substance such as ceramic such as alumina, a plastic substrate, a silicon wafer, a metal plate, or the like can be used for the substrate 701.

Although not shown here, in order to prevent an impurity from mixing into a semiconductor film or the like from the substrate 701, a blocking film such as a silicon nitride film, a silicon oxide film, a silicon nitride oxide film, or a stacked film thereof may be formed over the substrate 701.

Figure 7B:
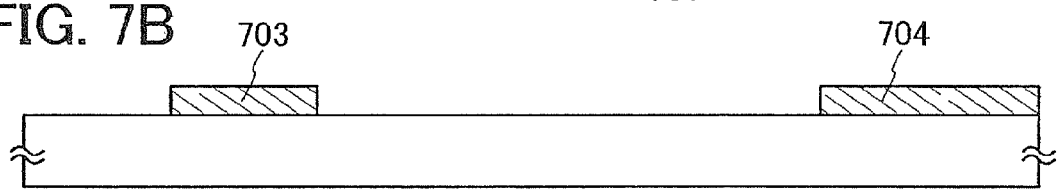

Next, a gate electrode 703 and a gate line 704 are formed by patterning of a first conductive film 702 (FIG. 7B). In a case where the first conductive film 702 is formed by a film formation method such as sputtering or CVD, a mask is formed over the conductive film by droplet discharging, a photolithography step, exposure of a photosensitive material using a laser beam direct drawing apparatus and development, or the like. Then, the conductive film is patterned into a desired shape using the mask.

Since the pattern can be directly formed when a droplet discharging method is used, the gate electrode 703 and the gate line 704 are formed by discharging and heating a liquid substance in which the above metal particles are dissolved or dispersed in an organic resin from an outlet (hereinafter, referred to as a nozzle). The organic resin may be one or more kinds of organic resins serving as a binder, solvent, a dispersing agent, and a coating agent of metal particles. Typically, polyimide, acrylic, a novolac resin, a melamine resin, a phenol resin, an epoxy resin, a silicon resin, a furan resin, a diallyl phthalate resin, and other known organic resins are given.

Note that the viscosity of the liquid substance is preferably 5 to 20 mPa·s for preventing drying and for allowing the metal particles to be discharged smoothly from the outlet. The surface tension of the liquid substance is preferably 40 mN/m or less. Note that the viscosity and the like of the liquid substance may be set appropriately in accordance with a solvent to be used or the application.

Although the diameter of the metal particle contained in the liquid substance may be several nm to 10 μm, it is preferably as small as possible in order to prevent a nozzle from clogging and to make high-resolution patterns. Much preferably, each metal particle has a grain diameter of 0.1 μm or less.

Then, an insulating film 705 is formed. The insulating film 705 is formed to have a single layer structure or a stacked layer structure of a silicon oxide film, a silicon nitride film, a silicon oxynitride film, a silicon nitride oxide film, other insulating films containing silicon, or the like by a film formation method such as CVD or sputtering. A thickness of the insulating film 705 is preferably 300 to 500 nm, and much preferably 350 to 480 nm.

Next, a first semiconductor film 706 is formed. The first semiconductor film 706 can be formed by a film formation method such as CVD or sputtering. The first semiconductor film 706 can be formed using any of an amorphous semiconductor film, an amorphous semiconductor film partially containing a crystalline state, and a crystalline semiconductor film, each of which contains silicon, silicon-germanium (SiGe), or the like as its main component and has a different crystalline state. In addition, the first semiconductor film 706 may also contain an acceptor element or a donor element such as phosphorus, arsenic, or boron in addition to the above main component. A thickness of the first semiconductor film 706 is preferably 40 to 250 nm, and much preferably 50 to 220 nm.

Figure 7C:
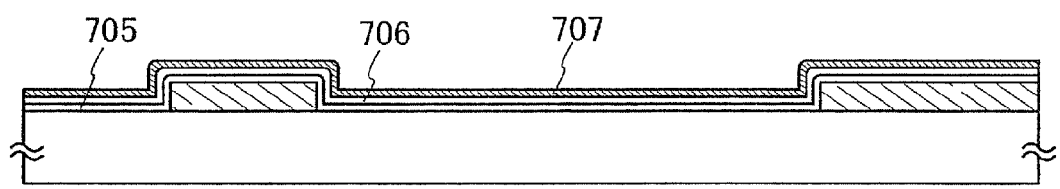

Then, a second semiconductor film 707 having one conductivity type is formed over the first semiconductor film 706. The second semiconductor film 707 is formed by a film formation method such as CVD or sputtering. A film formed here such as an amorphous semiconductor film, an amorphous semiconductor film partially containing a crystalline state, or a crystalline semiconductor film, each of which contains silicon or silicon-germanium (SiGe) as its main component and has a different crystalline state, contains an acceptor element or a donor element such as phosphorus, arsenic, or boron in addition to the above main component (FIG. 7C).

Figure 7D:
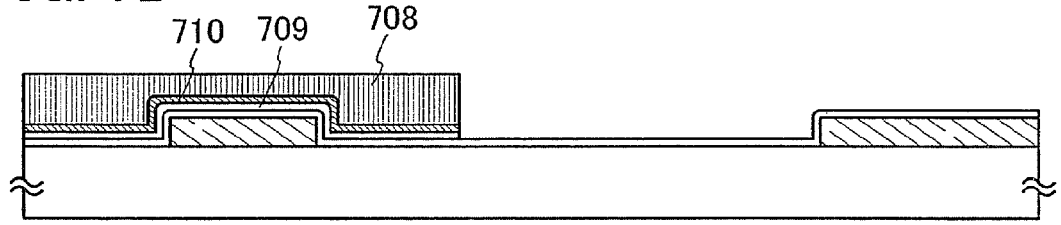
Figure 7E:
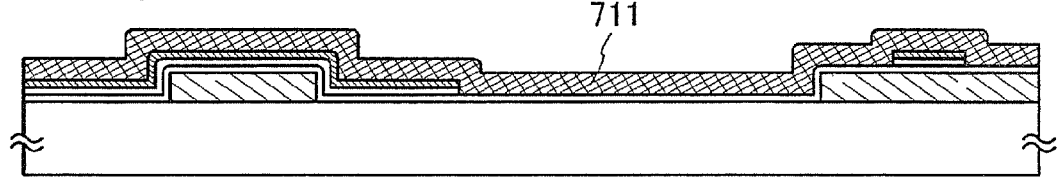

As shown in FIG. 7D, a first mask 708 is formed in a desired location over the second semiconductor film 707, and each part of the first semiconductor film 706 and the second semiconductor film 707 is etched using the masks; therefore, a first semiconductor film 709 and a second semiconductor film 710 are obtained, respectively, which are patterned (FIG. 7D). Note that the first semiconductor film 709 serves as a channel formation region of a TFT 714 which will be formed in the subsequent step.

After removing the first mask 708, a second conductive film 711 is formed over the second semiconductor film 710 and the insulating film 705. Note that a thickness of the second conductive film 711 is preferably 100 nm or more, and much preferably 200 to 700 nm. As the conductive material used for the second conductive film 711, a film formed of a metal element such as Ag, Au, Cu, Ni, Pt, Pd, Ir, Rh, W, Al, Ta, Mo, Cd, Zn, Fe, Ti, Si, Ge, Zr, or Ba, a film formed of an alloy material containing the element as its main component, a film formed of a compound material such as metal nitride, or the like can be given.

Figure 8A:
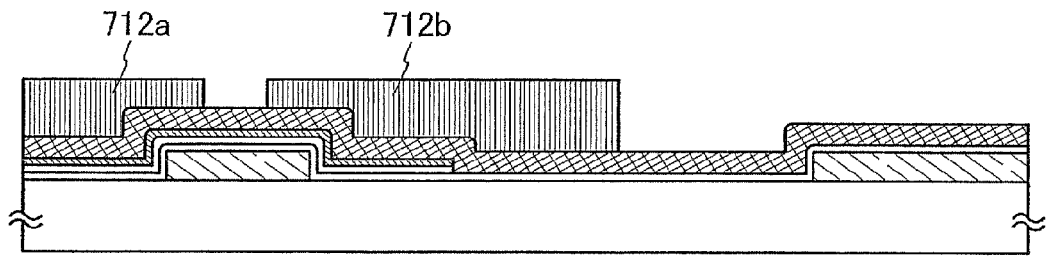
FIGS. 8A to 8D are views each explaining a manufacturing method of an active matrix substrate of the present invention.
Figure 8B:
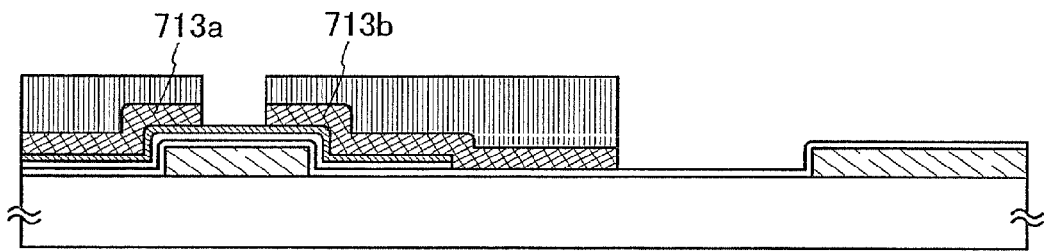

Second masks (712a and 712b) are formed over the second conductive film 711, and part of the second conductive film 711 is etched to be formed into a desired shape. Second conductive films (713a and 713b) which are patterned here serve as a source electrode or a drain electrode of the TFT (FIGS. 8A and 8B). In order to form the second conductive film 711 into a desired shape, a method can be employed, by which a mask is formed over the second conductive film 711 by droplet discharging, a photolithography step, exposure of a photosensitive material using a laser beam direct drawing apparatus and development, or the like to etch the second conductive film 711 into a desired shape using the mask.

Figure 8C:
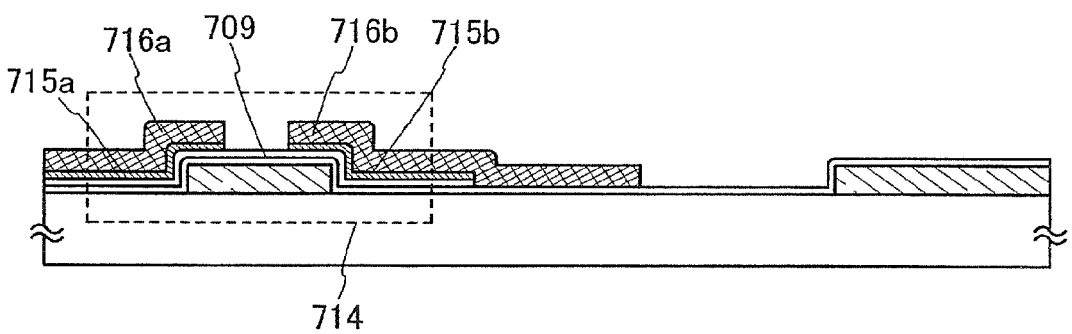

After removing the second masks (712a and 712b), part of the second semiconductor film 710 is etched using the patterned second conductive film (713a and 713b) as masks; therefore, a source region 715a and a drain region 715b of a TFT 714 are formed (FIG. 8C).

Note that, here, in the second conductive films (713a and 713b), a portion (713a) overlapped with the source region 715a is to be a source electrode 716a, and a portion (713b) overlapped with the drain region 715b is to be a drain electrode 716b.

Through the above, the TFT 714 including the gate electrode 703, the insulating film 705, the first semiconductor film (a channel formation region) 709, the source region 715a, the drain region 715b, the source electrode 716a, and the drain electrode 716b is formed (FIG. 8C).

Next, a protective film 717 is formed. Note that the protective film 717 is formed to have a single layer structure or a stacked layer structure of a silicon oxide film, a silicon nitride film, a silicon nitride oxide film, and a silicon oxynitride film by a film formation method such as plasma CVD or sputtering. A thickness of the protective film 717 is preferably 100 to 500 nm, and much preferably 200 to 300 nm.

Figure 8D:
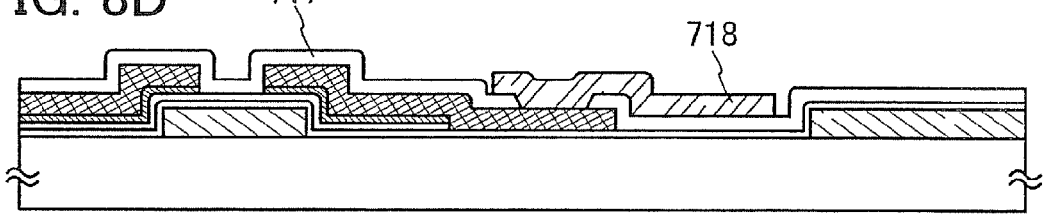

An opening is formed in a location which is part of the protective film 717 and overlapped with the drain electrode 716b to form a pixel electrode 718 electrically connected to the drain electrode 716b in the opening (FIG. 8D).

The pixel electrode 718 can be formed using a film formation method such as sputtering, evaporation, CVD, or coating. As the material used to form the pixel electrode 718, a transparent conductive film such as indium tin oxide (ITO), indium zinc oxide (IZO) formed by using a target in which zinc oxide (ZnO) of 2 to 20 wt % is further mixed with indium oxide containing silicon oxide, or MO containing silicon oxide as its composition can be used, and the pixel electrode 718 is formed by patterning of a conductive film formed of the above material. Note that a thickness of the pixel electrode 718 is 10 to 150 nm, and preferably 40 to 120 nm.

In addition, in a case of using a light-shielding substrate such as alumina, a silicon wafer, or a metal plate, as the material used to form the pixel electrode 718, a metal element such as Ag, Au, Cu, Ni, Pt, Pd, Ir, Rh, W, Al, Ta, Mo, Cd, Zn, Fe, Ti, Si, Ge, Zr, Ba, or Nd, an alloy material containing the metal element as its main component, a compound material such as metal nitride containing the metal element, or a material using a plurality thereof can be used.

Through the above steps, the active matrix substrate that can be used for the present invention can be formed. In addition, such a chamfer portion that is explained in Embodiment Mode 1 or 2 is formed at the end portion of such an active matrix substrate, and a common wring is formed in the chamfer portion in substitution for the wiring formed in the periphery of the pixel portion. Accordingly, a narrower frame of a display panel than that of a conventional display panel can be realized. Note that the structure of the display panel will be explained in detail in Embodiment Mode 4.

Embodiment Mode 4

This embodiment mode will explain a structure of the liquid crystal display panel of the present invention with reference to FIGS. 9A and 9B by exemplification of a liquid crystal display panel. FIG. 9A is a top view of a liquid crystal display panel in which a liquid crystal material is sandwiched between an active matrix substrate 901 and an opposite substrate 902. FIG. 9B corresponds to a cross-sectional view taken along a line A-A' in FIG. 9A.

In FIG. 9A, a portion 905 surrounded by a dotted line is a pixel portion. This embodiment mode has a structure where the pixel portion 905 is formed in a region surrounded by a sealant 903 and a driver circuit portion is mounted outside of the liquid crystal display panel through an FPC (Flexible Printed Circuit) 923.

The sealant 903 used for sealing a space between the active matrix substrate 901 and the opposite substrate 902 contains a gap material for maintaining the distance of the enclosed space. The space surrounded by the active matrix substrate 901, the opposite substrate 902, and the sealant 903 is filled with a liquid crystal material.

Next, the cross-sectional structure will be explained with reference to FIG. 9B. The pixel portion 905 is formed over a first substrate 907 which forms the active matrix substrate 901 and includes a plurality of semiconductor elements typified by TFTs. In addition, in this embodiment mode, a source line driver circuit and a gate line driver circuit are included in the driver circuit portion mounted outside.

The pixel portion 905 is provided with a plurality of pixels, and a first electrode 911 as a pixel electrode is electrically connected to a driving TFT 913 through a wiring. An orientation film 915 is formed over the first electrode 911, the driving TFT 913, and a gate line 914.

On the other hand, a second substrate 908, which forms the opposite substrate 902, is provided with a light-shielding film 916, a colored layer (color filter) 917, and a second electrode 919 as an opposite electrode. The second electrode 919 is provided with an orientation film 920.

In the liquid crystal display panel shown in this embodiment mode, a portion in which a liquid crystal material 912 is sandwiched between the first electrode 911 formed over the active matrix substrate 901 and the second electrode 919 provided for the opposite substrate 902 is a liquid crystal element 910.

Reference numeral 921 denotes a columnar spacer that is provided to control a distance (cell gap) between the active matrix substrate 901 and the opposite substrate 902. The columnar spacer 921 is formed by etching of an insulating film into a desired shape. Note that a spherical spacer may be used as well.

Various signals and potential to be given to the pixel portion 905 are supplied from an FPC 923 through a connection wiring 922. The connection wiring 922 and the FPC 923 are electrically connected to each other with an anisotropic conductive film or an anisotropic conductive resin 924. Note that a conductive paste such as solder or silver paste may be used instead of the anisotropic conductive film or the anisotropic conductive resin.

In addition, each pixel formed in the pixel portion 905 in matrix is connected in a vertical direction or a horizontal direction by a wiring 925. Note that, in the present invention, since a plurality of the wiring 925 over the active matrix substrate 901 are formed separately, a common wiring 926 is formed so as to be in contact with the wiring 925 to be able to electrically connect the wirings 925.

Although not shown, a polarizing plate is fixed by an adhesive onto one or both of the surface of the active matrix substrate 901 and the surface of the opposite substrate 902. Note that a retardation film may be provided additionally to the polarizing plate.

The liquid crystal display panel explained through the above is formed with the use of the active matrix substrate where the common wiring is formed in the chamfer portion in substitution for the wirings formed in the periphery of the pixel portion as explained in Embodiment Mode 1 or 2. Therefore, a narrower frame of a display panel than that of a conventional display panel can be realized.

Embodiment Mode 5

Figure 10:
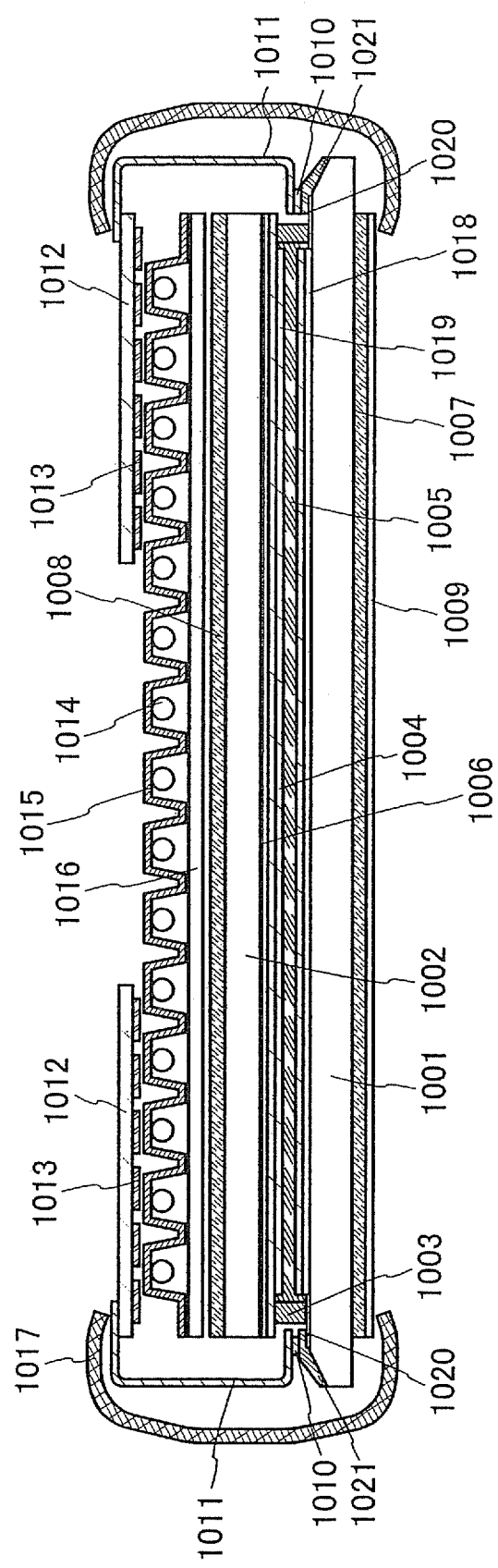
FIG. 10 is a view explaining a module of the present invention.

This embodiment mode will explain a module formed by connection of an external circuit such as a power supply circuit or a controller to a liquid crystal display panel (a liquid crystal module here), which is exemplified as the display panel of the present invention formed by implementation of Embodiment Modes 1 to 4, which displays color images using white light, with reference to a cross-sectional view of FIG. 10.

As shown in FIG. 10, an active matrix substrate 1001 and an opposite substrate 1002 are firmly fixed by a sealant 1003, and a liquid crystal material 1005 is provided between the active matrix substrate 1001 and the opposite substrate 1002; therefore, a liquid crystal display panel is formed.

Note that a chamfer portion of the active matrix substrate 1001 is formed by chamfering of an end portion thereof. Then, a common wiring 1021 is formed in the chamfer portion so as to be in contact with a wiring 1020 for electrically connecting a plurality of pixels formed in a pixel portion of the active matrix substrate 1001.

A colored film 1006 formed over the active matrix substrate 1001 is required in order to display color images. In a case of the RGB system, a colored film corresponding to each color of red, green, and blue is provided corresponding to each pixel. Orientation films 1018 and 1019 are formed inside the active matrix substrate 1001 and the opposite substrate 1002. In addition, polarizing plates 1007 and 1008 are provided outside the active matrix substrate 1001 and the opposite substrate 1002. A protective film 1009 is formed on the surface of the polarizing plate 1007 to reduce the external impact.

A connection terminal 1010 provided over the active matrix substrate 1001 is connected to a wiring board 1012 through an FPC 1011. The wiring board 1012 includes an external circuit 1013 such as a pixel driver circuit (an IC chip, a driver IC, or the like), a control circuit, or a power supply circuit.

A back light unit includes a cold cathode tube 1014, a reflecting plate 1015, an optical film 1016, and an inverter (not shown), which functions as a light source to emit light to the liquid crystal display panel. The liquid crystal display panel, the light source, the wiring board 1012, the FPC 1011, and the like are held and protected by a bezel 1017.

The module shown through the above includes the display panel using the active matrix substrate, the frame of which is narrowed, by formation of the common wiring in the chamfer portion in substitution for the wirings formed in the periphery of the pixel portion as explained in Embodiment Mode 4. Therefore, even in the case of forming the module, a smaller size (a narrowed frame) can be realized as compared with the conventional case.

Embodiment Mode 6

As electronic devices provided with the display device of the present invention, a television device (also simply referred to as a television or a television receiver), a camera such as a digital camera or a digital video camera, a telephone device (also simply referred to as a telephone set or a telephone), an information terminal such as a PDA, a game machine, a monitor for computer, a computer, an audio reproducing device such as a car audio system or an MP3 player, an image reproducing device provided with a recording medium, such as a home-use game machine, and the like are given. Preferred modes thereof will be explained with reference to FIGS. 11A to 11E.

Figure 11A:
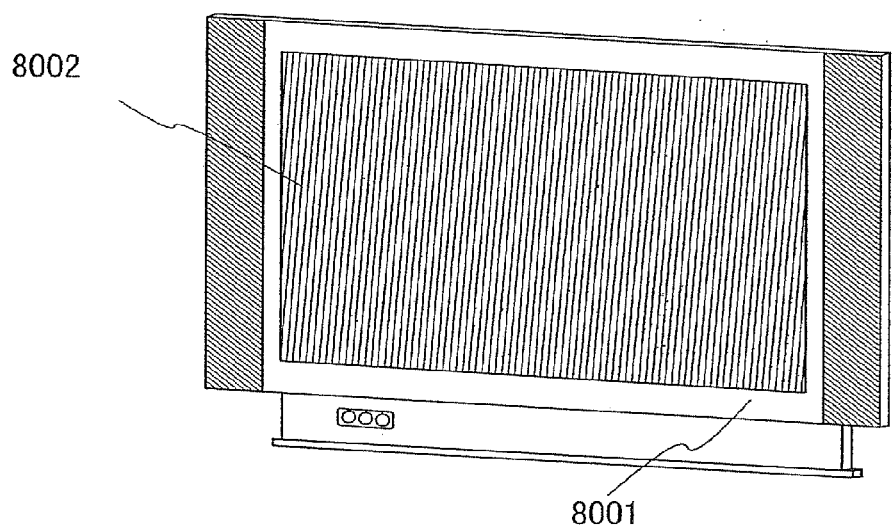
FIGS. 11A to 11E are views each explaining an electronic device.

A television device shown in FIG. 11A includes a main body 8001, a display portion 8002, and the like. The display device of the present invention can be applied to the display portion 8002. Note that, as the display device of the present invention, a display panel including an active matrix substrate, the frame of which is narrowed, is used by formation of a chamfer portion at the end portion of the substrate and formation of a common wiring in the chamfer portion in substitution for the wirings conventionally formed in the periphery of the pixel portion. Accordingly, it is possible to provide a television device, the size of which is made smaller (the frame of which is narrowed) and the wiring resistance of which is reduced as compared with a conventional television device.

Figure 11B:
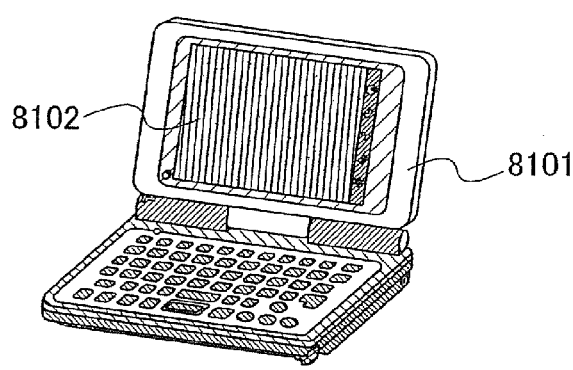

An information terminal device shown in FIG. 11B includes a main body 8101, a display portion 8102, and the like. The display device of the present invention can be applied to the display portion 8102. Note that, as the display device of the present invention, a display panel including an active matrix substrate, the frame of which is narrowed, is used by formation of a chamfer portion at the end portion of the substrate and formation of a common wiring in the chamfer portion in substitution for the wirings conventionally formed in the periphery of the pixel portion. Accordingly, it is possible to provide an information terminal device, the size of which is made smaller (the frame of which is narrowed) and the wiring resistance of which is reduced as compared with a conventional information terminal device.

Figure 11C:
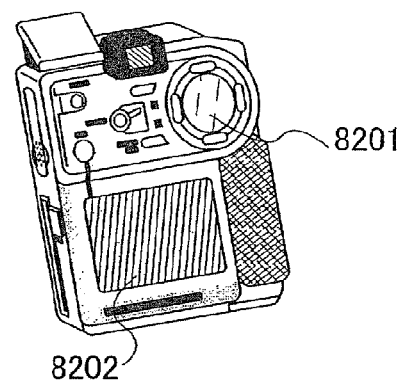

A digital video camera shown in FIG. 11C includes a main body 8201, a display portion 8202, and the like. The display device of the present invention can be applied to the display portion 8202. Note that, as the display device of the present invention, a display panel including an active matrix substrate, the frame of which is narrowed, is used by formation of a chamfer portion at the end portion of the substrate and formation of a common wiring in the chamfer portion in substitution for the wirings conventionally formed in the periphery of the pixel portion. Accordingly, it is possible to provide a digital video camera, the size of which is made smaller (the frame of which is narrowed) and the wiring resistance of which is reduced as compared with a conventional digital video camera.

Figure 11D:
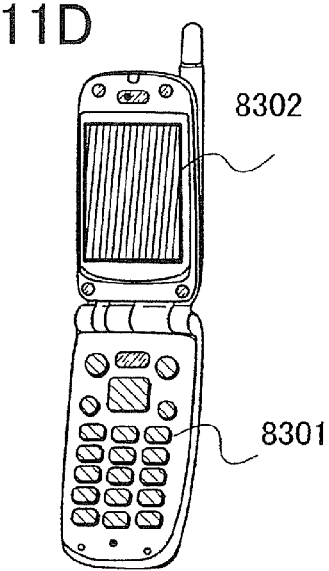

A telephone set shown in FIG. 11D includes a main body 8301, a display portion 8302, and the like. The display device of the present invention can be applied to the display portion 8302. Note that, as the display device of the present invention, a display panel including an active matrix substrate, the frame of which is narrowed, is used by formation of a chamfer portion at the end portion of the substrate and formation of a common wiring in the chamfer portion in substitution for the wirings conventionally formed in the periphery of the pixel portion. Accordingly, it is possible to provide a telephone set, the size of which is made smaller (the frame of which is narrowed) and the wiring resistance of which is reduced as compared with a conventional digital video camera.

Figure 11E:
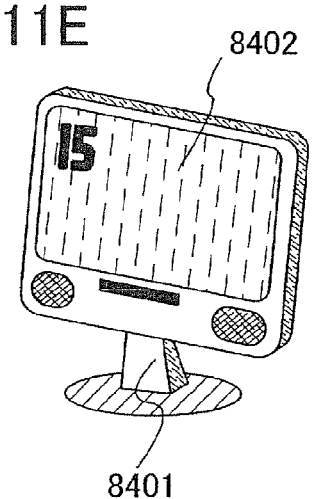

A liquid crystal monitor shown in FIG. 11E includes a main body 8401, a display portion 8402, and the like. The display device of the present invention can be applied to the display portion 8402. Note that, as the display device of the present invention, a display panel including an active matrix substrate, the frame of which is narrowed, is used by formation of a chamfer portion at the end portion of the substrate and formation of a common wiring in the chamfer portion in substitution for the wirings conventionally formed in the periphery of the pixel portion. Accordingly, it is possible to provide a liquid crystal monitor, the size of which is made smaller (the frame of which is narrowed) and the wiring resistance of which is reduced as compared with a conventional liquid crystal monitor.

A display device includes an active matrix substrate, the frame of which is narrowed, is used by formation of a common wiring in the chamfer portion, which is formed at the end portion of the substrate, in substitution for the wirings formed in the periphery of the pixel portion. With the use of the display device for a display portion thereof, it is possible to provide an electronic device, the size of which is made smaller (the frame of which is narrowed) as compared with a conventional electronic device.

The present application is based on Japanese Patent Application serial No. 2006-021722 filed on Jan. 31, 2006 in Japanese Patent Office, the entire contents of which are hereby incorporated by reference.

What is claimed is:

1. A display device comprising:
a first substrate;
a second substrate which is smaller than the first substrate over the first substrate;
a wiring over the first substrate; and
an indium tin oxide film over the second substrate,
wherein each of the first substrate and the second substrate includes a first end portion in a first side and a second end portion in a second side which is the other side of the first side,
wherein a distance from the first end portion of the second substrate to the first end portion of the first substrate is larger than a distance from the second end portion of the second substrate to the second end portion of the first substrate, and
wherein the second end portion of the first substrate has a slanted surface between a top surface and a side surface of the first substrate.

2. The display device according to claim 1, wherein the second end portion of the first substrate is chamfered.

3. The display device according to claim 1, further comprising a common wiring over the slanted surface.

4. The display device according to claim 3, wherein the wiring is electrically connected to the common wiring.

5. The display device according to claim 3, wherein the common wiring includes indium tin oxide.

6. The display device according to claim 1, wherein the second end portion of the first substrate is not overlapped with the second substrate.

7. The display device according to claim 1, wherein an external angle θ between the top surface of the first substrate and the slanted surface is 0°<θ<90°.

8. The display device according to claim 1, wherein a display element is interposed between the first substrate and the second substrate.

9. The display device according to claim 1, wherein the display device is an In-Plain Switching mode liquid crystal display device.

10. The display device according to claim 1, wherein the slanted surface is connected to the top surface and the side surface of the first substrate.

11. A display device comprising:
a first substrate;
a second substrate which is smaller than the first substrate over the first substrate;
a wiring over the first substrate;
an indium tin oxide film over the second substrate; and
a connection portion to a driver circuit,
wherein each of the first substrate and the second substrate includes a first end portion in a first side and a second end portion in a second side which is the other side of the first side,
wherein a distance from the first end portion of the second substrate to the first end portion of the first substrate is larger than a distance from the second end portion of the second substrate to the second end portion of the first substrate,
wherein the second end portion of the first substrate has a slanted surface between a top surface and a side surface of the first substrate, and
wherein the connection portion to the driver circuit is over the first substrate in the first side.

12. The display device according to claim 11, wherein the second end portion of the first substrate is chamfered.

13. The display device according to claim 11, further comprising a common wiring over the slanted surface.

14. The display device according to claim 13, wherein the wiring is electrically connected to the common wiring.

15. The display device according to claim 13, wherein the common wiring includes indium tin oxide.

16. The display device according to claim 11, wherein the second end portion of the first substrate is not overlapped with the second substrate.

17. The display device according to claim 11, wherein an external angle θ between the top surface of the first substrate and the slanted surface is 0°<θ<90°.

18. The display device according to claim 11, wherein a display element is interposed between the first substrate and the second substrate.

19. The display device according to claim 11, wherein the display device is an In-Plain Switching mode liquid crystal display device.

20. The display device according to claim 11, wherein the slanted surface is connected to the top surface and the side surface of the first substrate.

21. A display device comprising:
a first substrate;
a second substrate which is smaller than the first substrate over the first substrate;
a wiring over the first substrate; and
an indium tin oxide film over the second substrate,
wherein each of the first substrate and the second substrate includes a first end portion in a first side and a second end portion in a second side which is the other side of the first side, and includes a third end portion in a third side and a fourth end portion in a fourth side which is the other side of the third side, the third side being adjacent to the first side and the fourth side being adjacent to the second side,
wherein a distance from the first end portion of the second substrate to the first end portion of the first substrate is larger than a distance from the second end portion of the second substrate to the second end portion of the first substrate,
wherein a distance from the third end portion of the second substrate to the third end portion of the first substrate is larger than a distance from the fourth end portion of the second substrate to the fourth end portion of the first substrate, and
wherein each of the second end portion and the fourth end portion of the first substrate has a slanted surface between a top surface and a side surface of the first substrate.

22. The display device according to claim 21, wherein the second end portion of the first substrate is chamfered.

23. The display device according to claim 21, further comprising a common wiring over the slanted surface.

24. The display device according to claim 23, wherein the wiring is electrically connected to the common wiring.

25. The display device according to claim 23, wherein the common wiring includes indium tin oxide.

26. The display device according to claim 21, wherein the second end portion of the first substrate is not overlapped with the second substrate.

27. The display device according to claim 21, wherein an external angle θ between the top surface of the first substrate and the slanted surface is 0°<θ<90°.

28. The display device according to claim 21, wherein a display element is interposed between the first substrate and the second substrate.

29. The display device according to claim 21, wherein the display device is an In-Plain Switching mode liquid crystal display device.

30. The display device according to claim 21, further comprising a connection portion to a driver circuit over the first substrate in the first side and the third side.

31. The display device according to claim 21, wherein the slanted surface is connected to the top surface and the side surface of the first substrate.

\* \* \* \* \*